US009655089B2

United States Patent
Garg et al.

(10) Patent No.: US 9,655,089 B2
(45) Date of Patent: May 16, 2017

(54) SYSTEM AND METHOD FOR SILENT RETRY

(71) Applicant: Google Technology Holdings LLC, Mountain View, CA (US)

(72) Inventors: Sanjeev Garg, Arlington Heights, IL (US); Alfredo R. Castillo, West Dundee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/598,904

(22) Filed: Jan. 16, 2015

(65) Prior Publication Data

US 2015/0133140 A1    May 14, 2015

Related U.S. Application Data

(62) Division of application No. 10/894,552, filed on Jul. 20, 2004.

(51) Int. Cl.
| | |
|---|---|
| *H04B 7/00* | (2006.01) |
| *H04W 72/04* | (2009.01) |
| *H04B 7/26* | (2006.01) |
| *H04W 56/00* | (2009.01) |
| *H04W 88/08* | (2009.01) |

(52) U.S. Cl.
CPC ...... *H04W 72/0413* (2013.01); *H04B 7/2662* (2013.01); *H04W 56/00* (2013.01); *H04W 56/001* (2013.01); *H04W 88/08* (2013.01)

(58) Field of Classification Search
CPC .................................................. H04B 7/2662
USPC .......................................... 455/502; 370/324
See application file for complete search history.

(56) References Cited

U.S. PATENT DOCUMENTS

| | | | |
|---|---|---|---|
| 5,819,041 A * | 10/1998 | Bilgic | ................... H04W 88/08 455/418 |
| 5,995,844 A | 11/1999 | Fukuda | |
| 6,577,608 B1 | 6/2003 | Moon et al. | |
| 6,633,554 B1 * | 10/2003 | Dalal | ............................. 370/331 |
| 6,714,524 B1 | 3/2004 | Kim et al. | |
| 7,623,497 B2 * | 11/2009 | O'Neill | ......................... 370/338 |
| 2001/0021650 A1 | 9/2001 | Bilgic | |
| 2002/0094832 A1 | 7/2002 | Lee | |
| 2003/0119454 A1 | 6/2003 | Hattori | |
| 2003/0193911 A1 | 10/2003 | Zhao et al. | |

(Continued)

FOREIGN PATENT DOCUMENTS

EP    1220476 A2    7/2002

OTHER PUBLICATIONS

IS2000 Rev. A, C.S0005-A V6.0, "Table 2.7.1.3.2.4-8", 3rd Generation Partnership Project 2, 2002, pp. 2-544, 2-694, and 2-708.

*Primary Examiner* — Nay A Maung
*Assistant Examiner* — Angelica M Perez
(74) *Attorney, Agent, or Firm* — Lerner, David, Littenberg, Krumholz & Mentlik, LLP

(57) ABSTRACT

A system and method for synchronizing the operation of a wireless mobile station (102) and a base station (104) includes receiving a message at the base station (104) indicating a state of operation of the wireless mobile station (102). A determination is made as to whether the base station (104) and the mobile station (102) are in synchronization based upon comparing the state of operation of the mobile station (102) and a state of operation of the base station (104).

16 Claims, 3 Drawing Sheets

(56) References Cited

U.S. PATENT DOCUMENTS

| | | |
|---|---|---|
| 2004/0029606 A1 | 2/2004 | Tiedemann et al. |
| 2004/0259528 A1* | 12/2004 | Gandhi et al. ............... 455/411 |
| 2005/0025192 A1 | 2/2005 | Jang et al. |
| 2006/0003801 A1 | 1/2006 | Hattori |
| 2007/0217597 A1 | 9/2007 | Tiedemann et al. |

* cited by examiner

SYSTEM AND METHOD FOR SILENT RETRY

CROSS-REFERENCE TO RELATED APPLICATIONS

The present application is a divisional of U.S. patent application Ser. No. 10/894,552, filed, Jul. 20, 2004 the disclosure of which is incorporated herein by reference.

FIELD OF THE INVENTION

The invention relates generally to communication systems and networks and more particularly to establishing communications between users within these systems and networks.

BACKGROUND OF THE INVENTION

Systems and methods for transmitting information in a wireless manner are well known. In a wireless system, a sender at a source mobile station often communicates with a user at a destination mobile station. Before the communication between the different users can occur, several steps are often employed to establish a communication path between the users. In this regard, various messages are exchanged between the source mobile station, the destination mobile station, and the communication infrastructure that connects the units.

The different components of the system (e.g., mobile stations and base stations) operate using a state machine. The different states represent different modes in which the unit is operating, for example, in idle, page, or channel traffic states. Preferably, the states of the different elements of the system match so that optimum operation can occur. In other words, when the states of the different elements of the system become mismatched and unsynchronized, the system will likely not operate properly.

One result of the non-synchronization of the system elements is failure to establish the communication between a mobile station and base station. As a consequence of the failure, a silent retry is attempted whereby the source mobile attempts to establish the connection after the first attempt has not been successful. Usually, the users do not know that or when a silent retry has been attempted.

Previous systems and methods are unable to detect when the different components in the system are out of synchronization. Further, previous systems are not able to take corrective action if the elements are not synchronized. Moreover, in previous systems, silent retry does not always operate properly because there is no way to detect that the elements of the system are not in synchronization. As a result of these shortcomings, users of the mobile station often have a negative experience with the system and experience frustration since a connection cannot become established. In addition, system resources are wasted since the system performs certain actions that do not resolve the problem.

Figure 1:
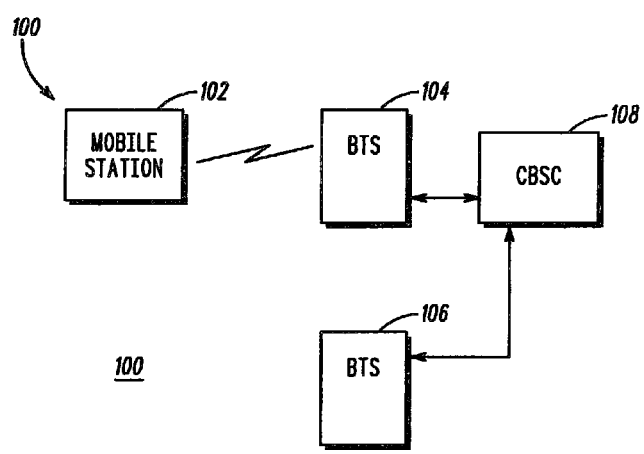
FIG. 1 is block diagram of an embodiment of a system for detecting the non-synchronization of system elements in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION OF THE PREFERRED EMBODIMENTS

Pursuant to many of these embodiments, a system and method determines whether a base station and a mobile station in a network are synchronized. Advantageously, corrective action is taken to resynchronize the two elements if non-synchronization is determined. As a consequence of achieving resynchronization, communications may be established across the network quickly and using a minimum amount of system resources.

Pursuant to one preferred approach, a system and method for synchronizing the operation of a wireless mobile station includes a receiver at a base station. The receiver receives a message at the base station indicating the state of operation of the wireless mobile station. A processing unit determines whether the base station and the mobile station are in synchronization based upon comparing the state of operation of the mobile station and a state of operation of the base station. A corrective action is taken when the mobile station and the base station are determined not to be in synchronization.

The corrective action adjusts the state of operation of the base station such that the state of operation of the base station and the state of operation of the mobile station are substantially the same. To determine non-synchronization, it may be determined if the mobile station is in traffic channel state and has acquired a traffic channel (TCH). The corrective action may result in preventing assignment messages (for instance, extended channel assignment messages (ECAMs)) from being sent to the mobile station until the occurrence of a predetermined event.

Thereafter, a silent retry may be automatically initiated at the mobile station upon a detection of an absence of the transmission of assignment messages. The silent retry from the mobile station is then received at the base station. A communication session is established between the base station and the mobile station after receiving the silent retry at the base station.

Pursuant to another preferred approach, a control message, for example, a Mobile Station order reject message, is received from a mobile station. It is determined from contents of the control message whether the mobile station is in a predetermined state and has acquired a channel. Responsive to the determination, assignment messages are prevented from being sent to the mobile station. Thereafter, a silent retry at the mobile station is made upon a detection of an absence of the assignment messages.

Thus, a system and method is described that allows the detection of the non-synchronization of a base station and a mobile station. The detection is accomplished easily and conveniently. Once non-synchronization has been determined, corrective action is taken to resynchronize the base station and the mobile station. Once this determination occurs, successful silent retry messages can be made and communications established between two users. System resources are conserved and user frustration at not being able to make a connection to another user is reduced or eliminated.

Referring initially to FIG. 1, a communication system 100 for detecting the non-synchronization of a base station and a mobile station is described in accordance with an embodiment of the present invention. The system 100 includes a mobile station 102, at least one base transceiver station (BTS), such as a first BTS 104 and a second BTS 106, and a centralized base station controller (CBSC) 108 that is operably coupled to each of the at least one BTS. The mobile station 102 may be any type of mobile communication device, for instance, a cellular telephone, pager, or personal digital assistant, to name a few. The mobile station 102 transmits messages to and receives messages from the BTS 104. Another BTS 106 may also receive messages from other mobile stations. Together, the at least one BTS 104, 106 and the CBSC 108 are collectively referred to herein as a Radio Access Network (RAN).

Each BTS 104, 106 includes functionality to receive and transmit messages to and from the mobile station 102 and to communicate with the CBSC 108. The CBSC 108 processes messages from the mobile station 102 received via the BTS 104. The CBSC 108 establishes communications between the mobile station 102 and another mobile station or destination communication unit, for example, a user of the public switched telephone network (PSTN). The CBSC 108 determines whether a base station and mobile station are not in synchronization. If the CBSC 108 makes this determination, it determines a corrective action to take bringing the mobile station and the base station back into synchronization.

Preferably, system 100 is Code Division Multiple Access (CDMA) communication system. However, those who are of ordinary skill in the art realize that communication system 100 may operate in accordance with any wireless telecommunication system, such as but not limited to a Global System for Mobile Communications (GSM) communication system, a Time Division Multiple Access (TDMA) communication system, a Frequency Division Multiple Access (FDMA) communication system, or an Orthogonal Frequency Division Multiple Access (OFDM) communication system.

Figure 2:
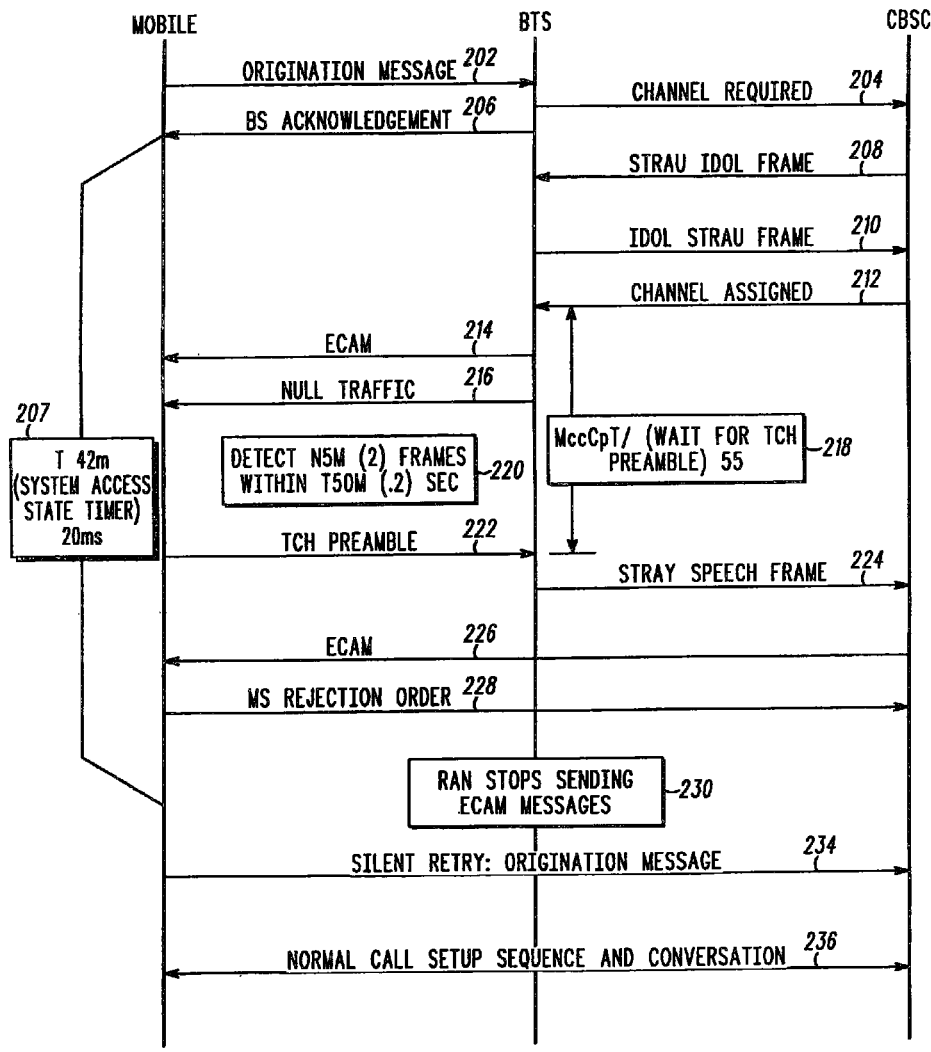
FIG. 2 is a call flow diagram of an embodiment for detecting the non-synchronization of system elements and the taking of a corrective action as a result of detecting the non-synchronization in accordance with an embodiment of the present invention.

Referring now to FIG. 2, a method for establishing synchronization between a mobile station, such as mobile station 102, and a base station serving the mobile station, such as BTS 104, in accordance with an embodiment of the present invention is described. At step 202, the mobile station, that is, mobile station 102, sends an origination message to the base transceiver station (BTS), that is, BTS 104. The origination message specifies that the mobile station desires to originate a communication with another user.

At step 204, the BTS sends a channel required message to a CBSC serving the BTS, that is, CBSC 108. The message indicates that the base station, that is, BTS 104, requests a communication channel. At step 206, the BTS sends a BS acknowledgment message to the mobile station. The purpose of the acknowledgment message is to ensure that the origination message arrived successfully.

In addition, in response to receiving the origination message, at step 207 the BTS activates a system timer, for example, a 20 second timer. The timer expires if call setup is unsuccessful. The mobile station will retry to setup without human interaction after the expiration of the timer. At step 208, the CBSC sends a STRAU Idol frame message to the BTS. At step 210, the BTS sends an Idol STRAU frame to the CBSC. As is known the STRAU frames are network backhaul management messages and hence no further elaboration is required here regarding such frames.

At step 212, a channel assigned message is sent from the CBSC to the BTS. This message indicates that a channel has been successfully assigned. At step 214, the BTS sends the mobile station an ECAM message. The ECAM message includes channel assignment parameters for use by the mobile station and initiates the establishment of a traffic channel.

At step 216, the BTS sends the mobile station null traffic messages. At step 218, the BTS waits to receive a TCH preamble. At step 220, the mobile station attempts to detect a certain number of N5M forward null frames, for instance, two, within a predetermined time period, for example, 0.2 seconds. If the mobile station fails to detect the number of frames within the predetermined time period, then it indicates that the base station and the mobile are not synchronized.

At step 222, a TCH preamble is sent by the mobile station to the BTS. At step 224, a STRAU speech frame is sent by the BTS to the CBSC.

At step 226, an ECAM is sent by the CBSC to the mobile station. At step 228, a Mobile Station (MS) rejection order message is sent by the mobile station to the CBSC. The Mobile Station rejection order message includes fields to indicate if the order is sent on an access channel, an enhanced access channel, or an up-reverse channel. Another field is used to indicate whether the mobile station initiated a silent retry after the mobile station received an access attempt failure from the ARQ sublayer for a user initiated origination. Still another field indicates that the cause of the rejection is that the message was not accepted in the current state or for an unspecified reason.

At step 230, the RAN stops sending ECAM messages. The halt to the sending of the ECAM messages occurs because a state mismatch has been detected. The halt to the sending of the ECAM messages allows a silent retry to be made by the mobile station, and, therefore, a successful connection between source and destination to be made.

At step 234, a silent retry origination message is sent by the mobile station to the CBSC. At step 236, a normal call setup sequence occurs and the conversation between the mobile station and whomever the mobile station desires to establish communication with occurs.

Figure 3:
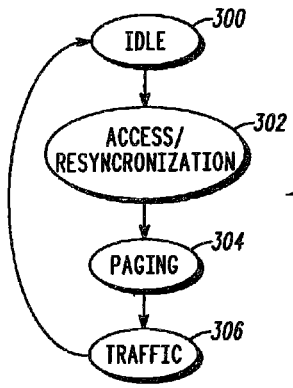
FIG. 3 is a flowchart of an embodiment showing the transitions from state to state in accordance with an embodiment of the present invention.

Referring now to FIG. 3, a state transition diagram showing the detection of non-synchronization of a mobile station, such as mobile station 102, and a base station serving the mobile station, that is, BTS 104, is described in accordance with an embodiment of the present invention. At step 300, the mobile station, that is, mobile station 102, and the base station, that is, BTS 104, are initially in idle state. In this state, no calls are occurring. At step 302, the base station and the mobile station enter an access state. The mobile station and the base station transition to this state when a call is initiated in the idle state. In this state, non-synchronization is detected between the mobile station and the base station and resynchronization is achieved. The synchronization allows silent retry messages to occur, for example. In the access state, access probe messages sent by the mobile station are received by the base station. When a valid message is received, the base station and mobile station transition to a paging state at step 304.

At step 304, the base station and the mobile station are in a paging state. In this state, the base station sends an acknowledgment (ACK) and channel assignment message (CHA) to the mobile station over the paging channel (PCH), including directions to the traffic channel (TCH). When the mobile station receives the ACK and CHA messages, the mobile station and the base station transition to a TCH state at step 306.

At step 306, the base station and the mobile station enter the TCH state. In this state, the TCH is connected between the mobile station and the base station. If the TCH is disconnected due to failure to connect or user/network initiated release then the mobile station and the base station transition to the idle state at step 300.

Figure 4:
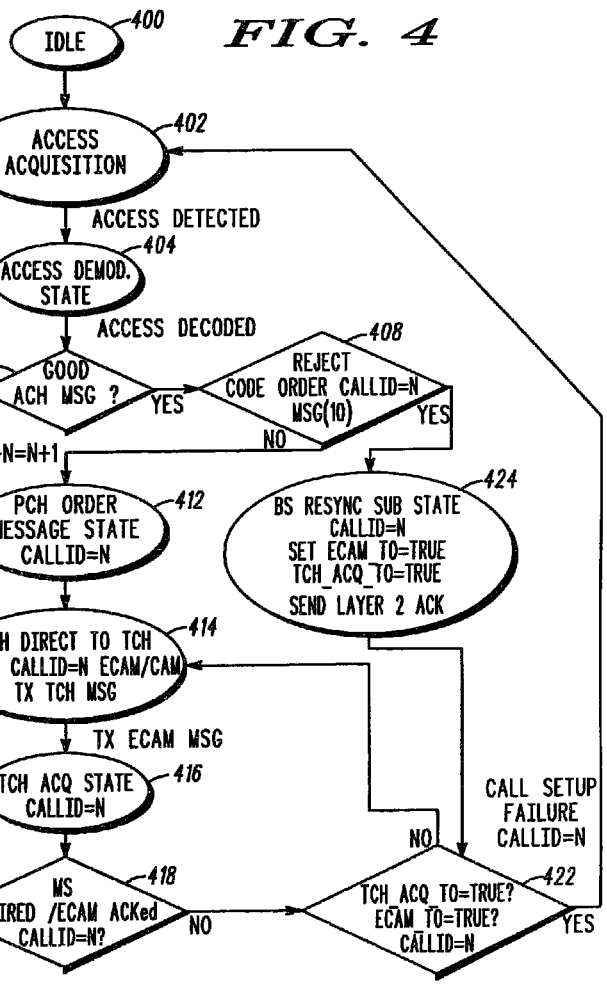
FIG. 4 is a detailed flowchart of an embodiment illustrating the steps performed in FIG. 3 in greater detail showing the transitions from state to state in accordance with an embodiment of the present invention.

Referring now to FIG. 4, a flowchart showing the steps of FIG. 3 in greater detail and in accordance with an embodiment of the present invention is described. As in step 300, at step 400 the system is in idle state. In the idle state, no communications are occurring. At step 402, the base station is in an access acquisition sub-state. The base station enters this state when a call is initiated in idle state. In this state, access channel messages are sent by the mobile station via an access channel and are received by the base station. When an access channel message is detected by the base station, the base station transitions to an access demodulation state at step 404.

At step 404, the base station is in access demodulation state. In this state, the base station demodulates received access channel messages, such as call origination messages and order messages. At step 406, a determination is made if a received access channel message is valid. If the access channel message is valid, the base station transitions to an access reject check state at step 408. When an access channel message is determined to be invalid, the base station transitions to an access acquisition sub-state, that is, returns to step 402.

At step 408, the base station is in an access reject check state. In this state, the base station checks if a received and valid access channel message is an order message and further comprises a reject order message, for example, whether the order message comprises an eight-bit cause field set to "00000001" (unspecified reason) or "00000010" (message not accepted in this state), which setting of the cause field corresponds to a reject order. If the check is negative, that is, the access message does not comprise a reject order message, then the base station transitions to a paging channel order sub-state, at step 412, and conveys a Layer 2 acknowledgement (L2 ACK) to the mobile station. If the check is affirmative, that is, the access channel message does comprise a reject order message, then the base station transitions to a base station re-synchronization sub-state at step 424.

At step 424, the base station is in a re-synchronization sub-state. In this sub-state, the base station synchronizes the call processing state of the base station with the call processing state of the mobile station. That is, at step 424, the base station sends a L2 ACK order to the mobile station confirming receipt of the access channel message. In addition, when, in a preceding iteration through the steps of FIG. 4, the base station has commenced retransmitting ECAM messages prior to entering the re-synchronization sub-state, for example, has transitioned to a paging channel direct to traffic channel sub-state at step 414, and has further transitioned to a traffic channel (TCH) acquisition sub-state at step 416, the base station further terminates transmission of ECAM messages by setting an Extended Channel Assignment Message Time Out (ECAM_TO) timer, or counter, maintained by the base station to "True" and stops the traffic channel acquisition sub-state by setting a Traffic Channel Acquisition Time Out (TCH_ACQ_TO) timer, or counter, maintained by the base station to "True." These actions result in the base station and mobile station becoming synchronized, or re-synchronized, in a same access state. The base station then proceeds to step 422, which step is described in greater detail below.

The base station may, additionally, change the ECAM_TO timer from false to true in response to the occurrence of any of a timing out by the ECAM_TO timer, a successful traffic channel acquisition, a receipt, from the mobile station, of a valid reject order message, or a receipt, from the mobile station, of a valid acknowledgement of an ECAM message. Also, the base station may, additionally, change the TCH_ACQ_TO time from false to true in response to the occurrence of any of timing out by the TCH_ACQ_TO timer, a successful traffic channel acquisition, or a receipt, from the mobile station, of a valid reject order message.

At step 412, the base station is in paging channel order sub-state. In this state, the base station sends an acknowledgment (ACK) to the mobile station over the paging channel and transitions to a paging channel direct to traffic channel (TCH) sub-state at step 414.

At step 414, the base station is in the paging channel direct to TCH sub-state. In this state, the base station sends a channel assignment message (a CAM or an ECAM) to the mobile station over the paging channel (PCH) with directions to a TCH. The base station also transitions to a traffic channel (TCH) acquisition sub-state. When the mobile station receives the channel assignment message, the mobile station also transitions to the TCH acquisition sub-state. The base station may then determine that the mobile station has successfully received a channel assignment message because of successful acquisition of the mobile station and/or a valid acknowledgment from the mobile station at step 418.

At steps 416 and 418, the base station is in TCH acquisition sub-state. In this state, the base station and the mobile station attempt to establish a TCH between the mobile station and the base station. If attempts to establish the TCH are successful, a call is established and the base station transitions to a TCH demodulation state, at step 420. If attempts to establish the TCH are unsuccessful, for example, due to failure to connect or user/network initiated release, then the base station transitions to step 422.

At step 420, the base station is in the TCH demodulation state. The base station enters this state when a TCH is successfully acquired and connected. At step 420, the base station and the mobile station are synchronized. In the TCH demodulation state, the base station demodulates TCH information received from the mobile station and the call proceeds as is known in the art.

At step 422, the base station determines whether one of the ECAM_TO timer, the TCH_ACQ_TO timer, or both the ECAM_TO timer and the TCH_ACQ_TO timer, has been set to true, for example, has timed out. When the base station determines that the one of the ECAM_TO timer, the TCH_ACQ_TO timer, or the ECAM_TO timer and the TCH_ACQ_TO timer, has been set to true, then the base station transitions to the access acquisition sub-state, at step 402. When the base station determines that the one of the ECAM_TO timer, the TCH_ACQ_TO timer, or the ECAM_TO timer and the TCH_ACQ_TO timer, has not been set to true, then the base station transitions to a paging channel direct to TCH sub-state at step 414.

By proceeding through the steps of FIGS. 3 and 4, a base station is able to ascertain a lack of synchronization with a mobile station serviced by the base station and, perhaps more importantly, is able to re-synchronize with the mobile station.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method for initiating a silent retry message comprising:
   receiving, by a radio access network (RAN), a traffic channel control message from a mobile station;
   determining, by the RAN, from contents of the traffic channel control message, whether the mobile station is in a predetermined state and has acquired a channel, the predetermined state being mismatched with a state of a base station of the RAN and assignment messages to the mobile station from the base station were not accepted in the predetermined state; and
   responsive to the determination corresponding to the mismatch, the RAN preventing further assignment messages from being sent to the mobile station,
   whereby the absence of the further assignment messages being sent to the mobile station initiates the silent retry at the mobile station.

2. The method of claim 1 wherein receiving the traffic channel control message comprises receiving a Mobile Station order reject message.

3. The method of claim 1 wherein determining from the contents of the traffic channel control message comprises determining whether the mobile station is in a state expecting direction to a traffic channel.

4. The method of claim 1 wherein preventing further assignment messages from being sent comprises preventing extended channel assignment messages (ECAMs) from being sent.

5. The method of claim 1 further comprising receiving the silent retry from the mobile station.

6. The method of claim 5 further comprising establishing a communication session between the base station and the mobile station after receiving the silent retry at the base station.

7. The method of claim 1, wherein, upon receiving the traffic channel control message, the method further comprises activating a system timer.

8. The method of claim 1, wherein preventing the further assignment messages from being sent to the mobile station occurs upon receipt of a rejection order received from the mobile station.

9. The method of claim 1, wherein the mismatch indicates a lack of synchronization between the mobile station and the base station.

10. A radio access network (RAN) for initiating a silent retry comprising:
    a receiver for receiving a traffic channel control message from a mobile station; and
    a processor communicatively coupled to the receiver, wherein the processor:
       determines from contents of the traffic channel control message whether the mobile station is operating in a predetermined state and has acquired a communication channel, the predetermined state being mismatched with a state of a base station of the RAN and assignment messages to the mobile station from the base station were not accepted in the predetermined state; and
       selectively stops forming further assignment messages based upon the determination corresponding to the mismatch,
    whereby the stopping of formation of further assignment messages initiates the silent retry at the mobile station.

11. The RAN of claim 10 wherein the traffic channel control message comprises a Mobile Station order reject message.

12. The RAN of claim 10 wherein the processor comprises means for determining whether the mobile station is in channel traffic state and has acquired a traffic channel (TCH).

13. The RAN of claim 10 wherein the processor comprises means for preventing further extended channel assignment messages (ECAMs) from being sent.

14. The RAN of claim 10, wherein, upon receipt of the traffic channel control message by the receiver, the device is further configured to activate a system timer.

15. The RAN of claim 10, wherein the further assignment messages are stopped from being sent to the mobile station by the processor upon receipt of a rejection order received from the mobile station.

16. The RAN of claim 10, wherein the mismatch indicates a lack of synchronization between the mobile station and the base station.

* * * * *